United States Patent [19]

Hung

[11] Patent Number: 5,286,471
[45] Date of Patent: Feb. 15, 1994

[54] GRAPHITE FLOURIDE FROM IODINE INTERCALATED GRAPHITIZED CARBON

[75] Inventor: Ching-Cheh Hung, Westlake, Ohio

[73] Assignee: The United States of America as represented by the Administrator of the National Aeronautics & Space Administration, Washington, D.C.

[21] Appl. No.: 884,097

[22] Filed: May 15, 1992

[51] Int. Cl.$^5$ .............................................. C01B 31/04
[52] U.S. Cl. .................................... 423/448; 423/460
[58] Field of Search ........................ 423/445, 448, 460

[56] References Cited

U.S. PATENT DOCUMENTS

| | | | |
|---|---|---|---|
| 3,627,571 | 12/1971 | Cass et al. | 423/448 |
| 4,423,261 | 12/1983 | Watanabe et al. | 570/150 |
| 4,645,620 | 2/1987 | Palchan et al. | 252/502 |
| 4,795,624 | 1/1989 | Nalewajek | 423/439 |
| 4,957,661 | 9/1990 | Hung | 252/510 |

OTHER PUBLICATIONS

"Synthesis and Stability of Br$_2$, ICl and IBr Intercalated Pitch-Based Graphite Fibers"—Synthetic Metals (1988) pp. 185-194 NASA Preprint for Technology 2000 (no month).
"Industrial Application of Graphite Fluoride Fibers"—Nov. 27-28, 1990.
American Carbon Soc., Extended Abstract for the Twentieth Biennial Conference on Carbon Jun. 23-28, 1991, pp. 698-699.
"The Properties of the Interstitial Compounds of Graphite. III. The Electrical Properties of the Halogen Compounds of Graphite" Journal of Chemical Physics. vol. 20. No. 9-Sep. 1952, pp. 1443-1447.
"Magnetische Untersuchungen zur Einwirkung der Halogene auf Graphit"—Zeitschrift fur anorganische und allgemeine Chemie. 1957, pp. 46-57 (no month).
Action du bromure d'iode sur le graphit. Academie des Science Dec. 15, 1957—pp. 2294-2295.
"Properties and Potential Applications of Brominated P-100 Carbon Fibers"—SAMPE Quarterly, Oct. 1986.
NASA TM's: 87026 Jun. 1985; 100106 Jul. 1987; 100156 Aug. 1987; 102511 Jun. 1989; and 103265 Aug. 1990 (1988-1990).

*Primary Examiner*—Michael Lewis
*Assistant Examiner*—Stuart L. Hendrickson
*Attorney, Agent, or Firm*—Gene E. Shook; Guy M. Miller; James A. Mackin

[57] ABSTRACT

Graphite fluoride is produced from graphitized carbon. A bromine iodine mixture reacts with graphitized carbon to produce iodine intercalated graphitized carbon that is then exposed to fluorine.

1 Claim, 2 Drawing Sheets

GRAPHITE FLOURIDE FROM IODINE INTERCALATED GRAPHITIZED CARBON

ORIGIN OF THE INVENTION

The invention described herein was made by an employee of the U.S. Government and may be manufactured and used by or for the Government without the payment of any royalties thereon or therefor.

TECHNICAL FIELD

This invention is concerned with producing graphite fluoride from graphitized carbon. The invention is particularly directed to the reaction of iodine with graphitized carbon to produce iodine intercalated graphitized carbon from which the graphite fluoride is produced.

In the prior art iodine intercalation with graphite was considered extremely slow. Iodine intercalation with graphitized carbon fibers was considered impossible.

Research and experiments conclude that natural graphite and pyrolytic graphite having an interplanar spacing of about 3.35 Å is inert to iodine, but a bromine residue compound of graphite does slowly react with iodine. This residue compound is produced by brominating natural or pyrolytic graphite and then letting the brominated product debrominate at ambient or high temperature in air until stabilized.

For graphitized carbon fibers having an interplanar spacing larger than 3.35 Å iodine does not react with either graphitized carbon fibers or a graphitized carbon fiber-bromine residue compound. Graphite fluoride has been made by reacting fluorine gas with graphite. Also, graphite fluoride has been made by reacting fluorine gas with brominated graphitized carbon fibers, as taught in U.S. Pat. No. 4,957,661.

Previously iodine intercalated graphite was very difficult to obtain because iodine does not react with graphite. Also, the reaction between iodine and bromine residue compound of graphite is so slow that it takes about six months for the reaction to be significant. In the prior art iodine intercalated graphitized carbon fibers were only theoretical because iodine was not found to react with either graphitized carbon fibers or the bromine residue compound of the graphitized carbon fibers. In the past graphite was found to react with ICl and IBr, resulting in intercalated graphite containing iodine. However, the amount of iodine in the graphite is smaller than the amount of chlorine or bromine in the graphite.

Graphite fluoride made from the direct reaction between fluorine and graphite fiber had extensive structural damage throughout the entire fiber. The graphite fluoride made from the reaction between fluorine and brominated graphitized carbon fibers also has significant structural damage near the fiber surfaces.

It is, therefore, an object of the present invention to make graphite fluoride with minimum structural damage.

Another object of the invention is to provide a method of fast iodine intercalation with both graphite and graphitized carbon fiber.

A still further object of the invention is to produce an iodine intercalated graphite material and a method of using this material to produce graphite fluoride.

BACKGROUND ART

Various methods have been proposed to produce fluorinated carbon. Among these are U.S. Pat. No. 4,645,620 to Palchan et al which is directed to a method for producing intercalation compounds of graphite which exhibit high conductivity. Graphite is reacted with fluorine in a sealed system under pressure, and in the presence of a catalytic amount of fluorine compound which itself can form an intercalation compound.

U.S. Pat. No. 4,795,624 to Nalewajek discloses a low temperature synthesis of carbon fluoride The process is prepared from a Group V-A pentahalogen intercalate and fluorine gas at temperatures at between 250° C. and 300° C.

U.S. Pat. No. 4,957,661 to Hung discloses methods of preparing graphite fluoride fibers and graphite fluoride fiber polymer composite materials Graphite fluoride fibers are produced by contact reaction of bromine intercalated graphitized fibers and fluorine gas.

DISCLOSURE OF THE INVENTION

The objects are achieved by the present invention which is directed to the production of graphite fluoride from graphitized carbon. Of particular importance is the reaction of iodine with graphitized carbon to produce iodine intercalated graphitized carbon.

The invention is particularly concerned with the reaction of graphitized carbon with a bromine iodine mixture. This reaction produces the intercalated graphitized carbon fiber necessary to synthesize the graphite fluoride fiber.

BRIEF DESCRIPTION OF THE DRAWINGS

The advantages and novel features of the invention will be more fully apparent from the following detailed description when read in connection with the accompanying drawings in which.

BEST MODE FOR CARRYING OUT THE INVENTION

According to the present invention graphitized carbon fibers with interplanar spacings larger than about 3.35 Å but smaller than about 3.43 Å were placed in a reactor containing air, isoprene rubber and an excess amount of solid iodine. The reactor was then heated to a temperature between about 50° C. and 150° C. As a result of such heating iodine vapor is in direct contact with the graphitized carbon fiber. The iodine partial pressure in the reactor continually increases until it nears the iodine vapor pressure. There is no chemical reaction between iodine and fiber at this point.

Liquid bromine is then added into the reactor. At the same time the reactor temperature is adjusted to the range of about 58° C. to 183° C. This temperature range is between bromine's boiling point and iodine's boiling point. The excess amount of bromine boils, and its vapor is vented and removed from the system. The iodine vapor and the small quantity of bromine remaining in the reactor together initiate the fiber intercalation reaction.

After the initiation reaction, the graphitized carbon fibers proceed with intercalation of iodine and bromine. The isoprene rubber selectively "captures" bromine vapor from the reactor, but not iodine. As a result, the vapor color changes from bromine's orange to iodine's purple. In addition, the majority of the intercalants that get into the carbon fibers is iodine.

If the reaction is stopped before the vapor in the reactor becomes purple, the product contains more intercalated bromine atoms than iodine atoms. If the reaction is stopped after the vapor in the reactor becomes purple, the product contains more iodine than bromine. The iodine and bromine in the fibers can be detected after 20 minutes of bromine and iodine exposure. However, in some cases this reaction requires two weeks of bromine and iodine vapor exposure to reach completion.

After the completion of this iodination reaction the fibers are removed from the reactor and placed in air between ambient room temperature and about 200° C. The fiber weight decreases rapidly initially, but it stabilizes very quickly in the first 10 minutes after removal from the reactor. However, the fibers continually lose a very small amount of weight of less than 1%, and it takes about two weeks for the fibers to reach the final weight.

It has been found that the final mass of the fibers after the above described intercalation process is typically between about 18% and about 25% greater than that of the fibers before the reaction. The electrical conductivity becomes about 3 to about 7 times the before reaction value. Typical values in atomic percents of both bulk and surface composition of the graphite fluoride fibers are set forth in Table I.

Figure 1:
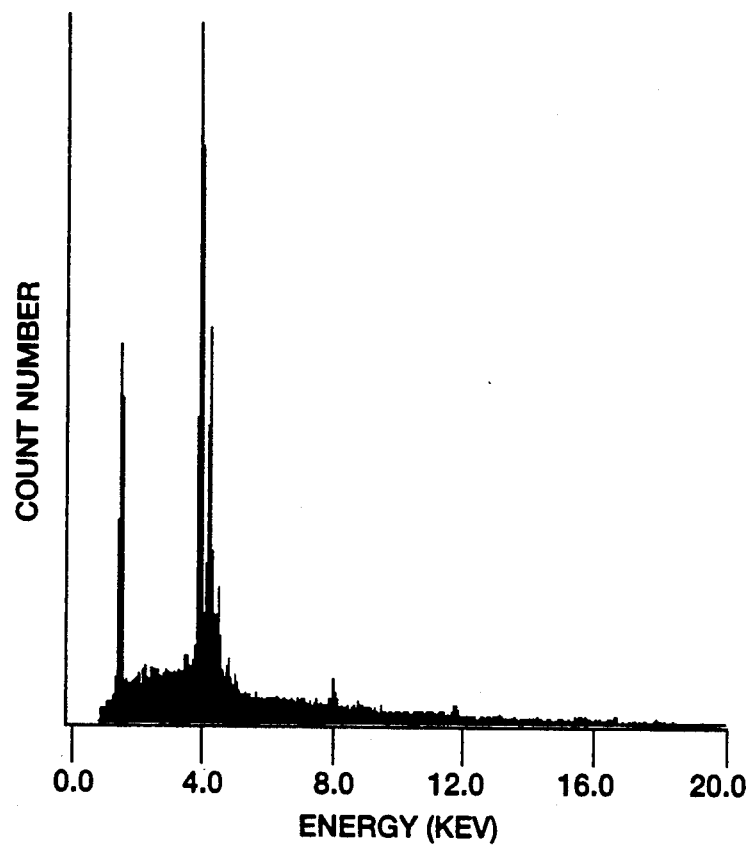
FIG. 1 is an energy disperse spectrum (EDS) of a graphitized carbon fiber after exposure to bromine and iodine simultaneously.

FIG. 1 shows a scanning electron microscope's energy disperse spectrum of the fiber produced by the above described method. It can be seen that the iodine peaks near 4 Kev are strong, but the bromine peaks near 1.5 Kev and 12 Kev are small. The calculated iodine to bromine atomic ratio is about 11.

Figure 2:
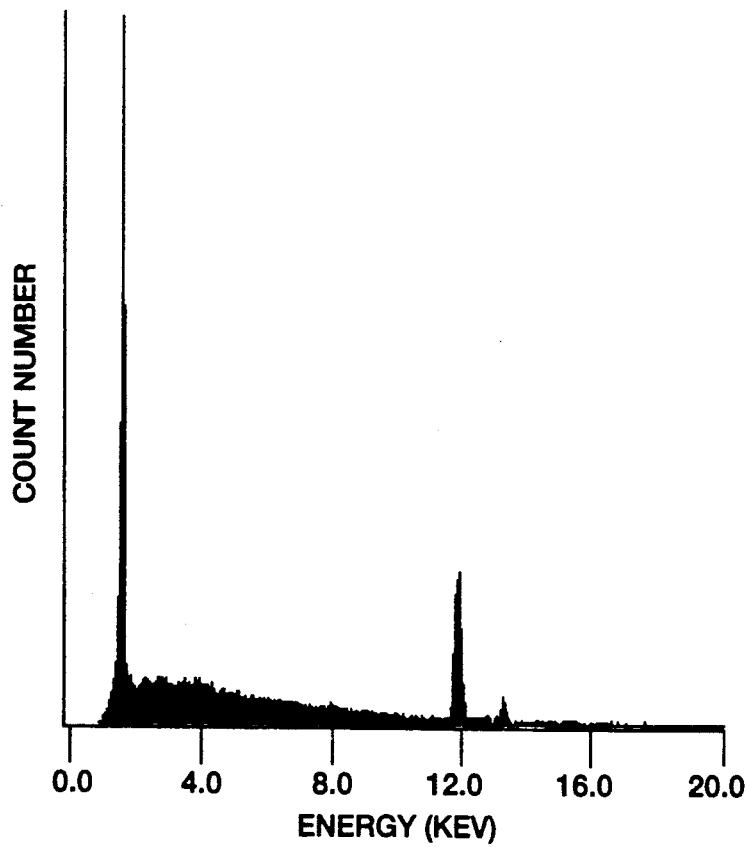
FIG. 2 is an energy disperse spectrum (EDS) of a graphitized carbon fiber after treatment with the sequence of exposing to bromine for bromination, exposing to air for debromination, and exposing to iodine.

For comparison purposes, FIG. 2 shows the spectrum of a brominated carbon fiber residue compound after three days of pure saturated iodine vapor contact at about 100° C. No iodine peaks are observed. Thus, it is evident that iodine intercalation can occur only with the exposure of bromine to the graphite carbon fiber surface to initiate the reaction.

These iodine intercalated graphite carbon fibers are then exposed to fluorine gas at a temperature between 300° C. and 400° C. to produce graphite fluoride fibers. This fluorination process is described in detail in U.S. Pat. No. 4,957,661.

DESCRIPTION OF ALTERNATE EMBODIMENTS

In an alternate embodiment the process for producing iodine intercalated fibers places graphitized carbon fibers, iodine, bromine, and isoprene rubber or iron powder into a reactor simultaneously. The iron powder, a pure metal, functions in the same manner as the isoprene rubber in removing bromine. The material is first held in the temperature range of about −7° C. to about 40° C. for bromination of graphite fibers to occur. The material is then heated to a temperature between about 58° C. and about 180° C., which is the range between the boiling point of bromine and the boiling point of iodine. This enables the iodine intercalation to proceed.

The advantage of this alternate embodiment of the process is that it is simple. However, the formation of IBr and HBr due to iodine-bromine and rubber-bromine reactions, respectively, makes the reaction chemistry complicated. Therefore, the properties of the reaction products are less predictable.

A second alternative for producing iodine intercalated fibers is to first place bromine, rubber, and fibers into the reactor at about −7° C. to about 40° C. to partially or completely brominate the fibers. Iodine is then added to the reactor and the temperature is raised to about 58° C. to about 183° C. This procedure reduces the bromine-iodine side reactions which, in turn, improves the product reproducibility.

A third alternative for producing iodine intercalated fibers is to place the rubber in the reactor after bromination to remove excess bromine during the iodine reaction. This procedure reduces the formation and interference of HBr produced by bromine-rubber reactions.

Still another alternative for producing iodine intercalated fibers is not to use any rubber. In this embodiment all other conditions are maintained the same as in all the previously described processes. However, the temperature for iodine intercalation needs to be higher than 100° C. and the reaction time needs to be longer in order to obtain a product with iodine as the majority intercalant.

All of these processes including the preferred embodiment as well as the alternate embodiments were tested experimentally The empirical formula and interplanar spacings of ten typical products are estimated and described in Table II. In all of these processes air can be evacuated from the reactor. This enhances the iodine evaporation or sublimation rate which, in turn, enhances the iodination rate.

In all of the aforementioned processes for producing iodine intercalated fibers, ICl or IBr can be used to replace $Br_2$ in initiating the iodination reaction. However, during the first step of the process in which ICl or IBr begins to intercalate into the graphetized carbon fiber and to initiate the iodination reaction, the temperature must be maintained between 0° C. and 102° C. or 50° C. and 150° C., respectively. Also, for the second step of the process in which ICl or IBr is evaporated and the iodination reaction proceeds, the temperature must be maintained between 97° C. and 183° C. or 116° C. and 183° C., respectively. The iodinated products have chlorine and bromine as minority intercalant, respectively.

It is also contemplated that in all of these processes graphite powder, pyrolitic graphite, or natural graphite can be used to replace the graphitized carbon fiber for iodination. By these methods iodine can be intercalated as a majority intercant into graphitized carbon fibers, pyrolytic graphite, or natural graphite.

It is found that the iodine intercalation of the fibers can improve the electrical conductivity of the fibers by 3-7 times. This compares to a five-fold improvement by bromine intercalation of the fibers During subsequent fluorination to produce graphite fluoride fibers, the iodine intercalated fibers are more resistant to fluorine damage on the fiber surfaces than are bromine intercalated fibers.

Figure 3:
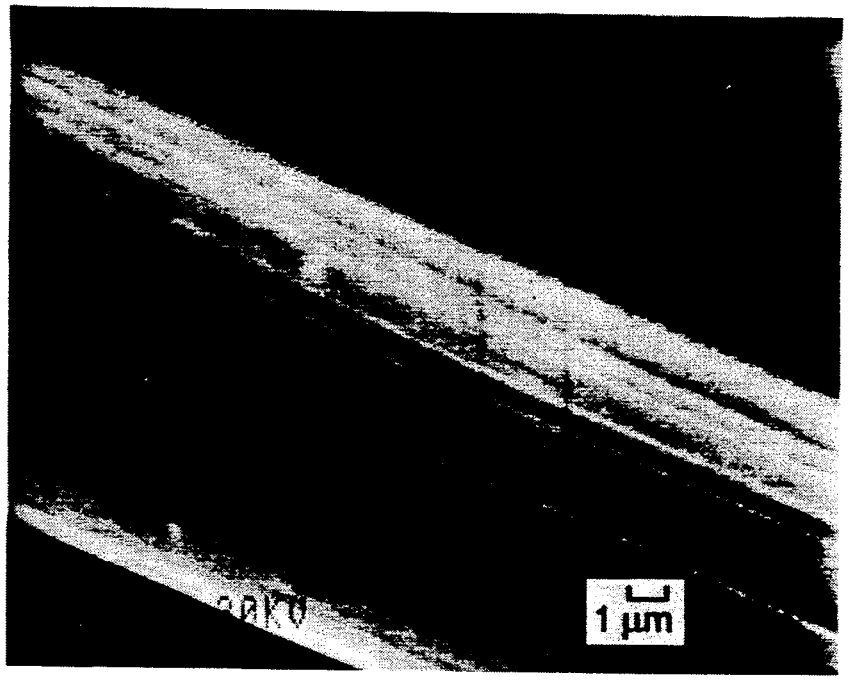
FIG. 3 is a photomicrograph of a graphite fluoride fiber obtained from fluorinating bromine intercalated graphitized carbon fiber.

FIG. 3 shows the typical damage on almost all brominated fiber surfaces caused by fluorine gas during the fluorination reaction.

Figure 4:
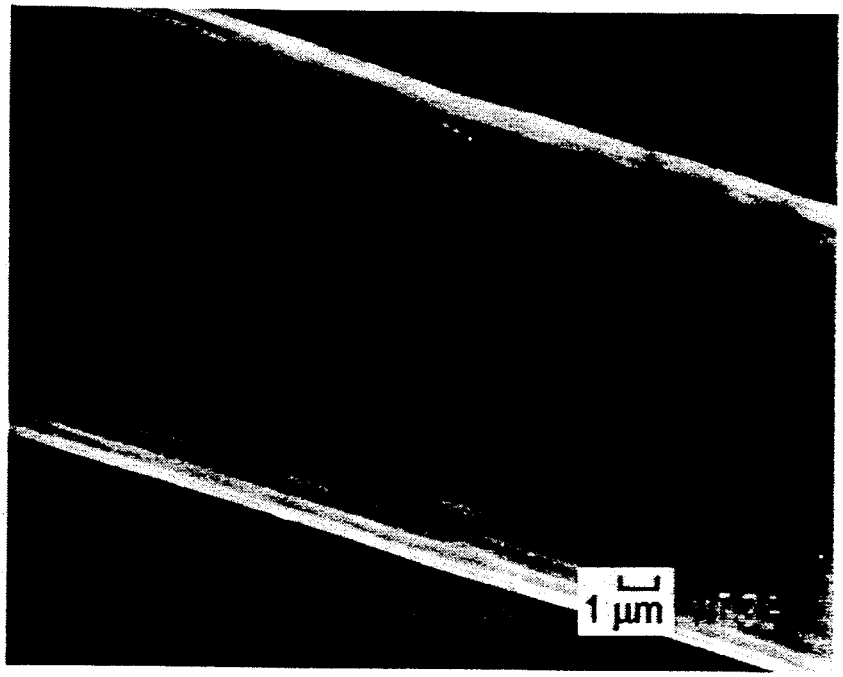
FIG. 4 is a photomicrograph of a graphite fluoride fiber obtained from fluorinating iodine and bromine intercalated graphitized carbon fiber.

FIG. 4 shows that the typical damage to iodine intercalated fibers by the fluorine gas during the same fluorination reaction is greatly reduced.

While several embodiments of the invention have been described, it will be appreciated that various procedural modifications may be made without departing from the spirit of the invention or the scope of the subjoined claims.

TABLE I

Approximate Chemical Composition on the Surface and in the Bulk of the Graphite Fluoride Fibers

| Element | Surface Concentration (%) | Bulk Concentration (%) |
| --- | --- | --- |
| $CBr_{0.0116}I_{0.0214}$ from vapor grown fibers (interplanar spacing 3.35) | | |
| C | 78 | 97 |
| O | 18 | 0 |
| Br | 4 | 1 |
| I | 0.1 | 2 |
| $CBr_{0.00281}I_{0.0258}$ from P-100 (interplanar spacing 3.37A) | | |
| C | 69 | 97 |
| O | 23 | 0 |
| Br | 8 | 0.3 |
| I | 0.05 | 3 |

TABLE II

Interplanar Spacing and Atomic Ratio of Typical Brominated and Iodinated Graphitized Carbon Fibers

| Interplanar Spacing | | Atomic Ratio After Reaction | | Total Intercalant To Carbon |
| --- | --- | --- | --- | --- |
| pristine fiber | after reaction | I/C | Br/C | Weight Ratio |
| 3.37 | 3.39 | 0 | 0.027 | 0.18 |
| 3.37 | 3.40 | 0 | 0.030 | 0.20 |
| 3.37 | 3.42 | 0.010 | 0.0158 | 0.21 |
| 3.37 | 3.42 | 0.0112 | 0.0089 | 0.18 |
| 3.37 | 3.42 | 0.0127 | 0.0098 | 0.20 |
| 3.37 | 3.43 | 0.0174 | 0.0061 | 0.22 |
| 3.37 | 3.43 | 0.0189 | 0.0053 | 0.24 |
| 3.37 | 3.44 | 0.0228 | 0.0059 | 0.28 |
| 3.37 | 3.44 | 0.0185 | 0.0045 | 0.23 |
| 3.37 | 3.45 | 0.0266 | 0.0028 | 0.30 |
| 3.38 | 3.45 | 0.0310 | 0.0020 | 0.34 |
| 3.38 | 3.45 | 0.0331 | 0.0023 | 0.37 |
| 3.35 | 3.35 | 0.0214 | 0.0116 | 0.30 |

What is claimed is:

1. A method of making graphite fluoride from graphitized carbon comprising placing graphitized carbon, powder consisting of iron metal, and solid iodine in a reactor, heating said reactor to a temperature between about 50° C. and about 150° C. thereby forming iodine vapor whereby said graphitized carbon is in direct contact with said vapor, adding liquid bromine into said reactor while simultaneously adjusting the temperature of said reactor to a temperature between bromin's boiling point of about 58° C. and iodine's boiling point of about 183° C. so that bromine boils creating a mixture of bromine vapor and iodine vapor whereby said bromine-iodine mixture initiates an iodine and bromine intercalation, selectively capturing bromine vapor from said reactor by said iron metal powder while maintaining said iodine vapor in said reactor until the majority of the intercalants in the carbon is iodine, removing the graphitized carbon from the reactor after completion of the iodine intercalation and placing the same in air whereby a portion of the bromine and iodine evaporates, and exposing said iodine intercalated graphitized carbon to fluorine gas to produce graphite fluoride.

* * * * *